(No Model.)
C. W. HUNT.
NUT LOCK.
No. 582,424. Patented May 11, 1897.
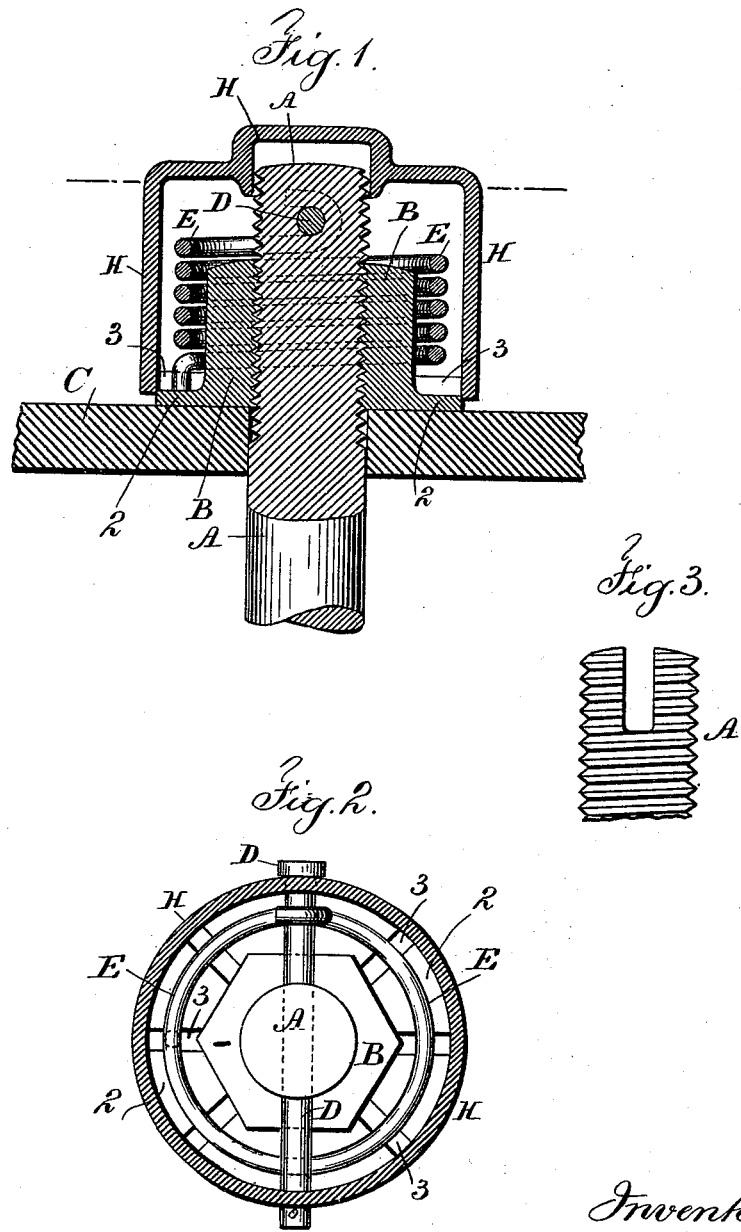

UNITED STATES PATENT OFFICE.

CHARLES W. HUNT, OF WEST NEW BRIGHTON, NEW YORK.

NUT-LOCK.

SPECIFICATION forming part of Letters Patent No. 582,424, dated May 11, 1897.

Application filed February 1, 1897. Serial No. 621,422. (No model.)

*To all whom it may concern:*

Be it known that I, CHARLES W. HUNT, a citizen of the United States, residing at West New Brighton, in the county of Richmond and State of New York, have invented an Improvement in Nut-Locks, of which the following is a specification.

Nuts upon screw-bolts in machinery, and especially on bolts that hold the caps of shaft-bearings, require to be set up to compensate for the wear of the shaft and bearing. In some instances a coiled spring has been made use of with one end acting against the nut to turn the same and take up any looseness, but the spring has been liable to injury and also to an accumulation of grease and dust or other foreign materials that are likely to interfere with the spring in its operation or to injure the same.

In my present invention a spring is employed with one end acting upon the nut to turn the same and set up such nut and prevent looseness, and the other end is supported by a pin passing across through the end of the bolt, and this pin also secures a cap that surrounds and protects the spring and the end of the bolt and the nut, and such cap passes down closely around the circular flange of the nut, the spring being within the cap, and by this construction foreign substances are kept from the spring and from the nut, and should any looseness arise between the nut and the device held by it the spring by turning the nut on the screw will set the same up and keep the parts tight.

In the drawings, Figure 1 is a vertical section of the end of the bolt, the nut, spring, and cap. Fig. 2 is a plan view endwise of the bolt with the cap in section, and Fig. 3 shows the end of the bolt slotted.

The bolt A is to be of any desired character and screw-threaded to receive the nut B, and the article against which the nut bears is represented at C. It is advantageous to make the nut round or polygonal with a circular base 2, and the end of the bolt A should project beyond the nut B sufficiently for a transverse hole receiving a cross-pin D.

The flange 2 is provided with grooves, slots, holes, or recesses, and into which one end of the spring E is introduced, such spring E being a coil or helix, and the end is bent to pass into one of the grooves or slots 3 in the flange 2, and the spring is sufficiently long for the other end to reach to and engage the cross-pin D.

It is preferable to make several slots 3 in the surface of the flange 2, so that after the nut has been screwed up to place the spring E can be placed around the nut with the bent end in one of the slots 3, and the spring is then to be wound sufficiently for turning the nut in the direction in which it is set up, and the end of the spring is hooked into or engages the cross-pin D. Hence as the parts of the engine or other article may become loose or worn any slackness is taken up progressively by the spring E, turning the nut B.

The cap H is advantageously made cylindrical and of metal, the open end of the cylinder fitting around the circular flange 2, and such cap is sufficiently long to contain the nut and spring, and the end of the bolt A advantageously passes into a circular recess in the head of the cap, as shown, and there is a transverse hole through the cap for the pin D to pass through.

It will now be understood that in applying the cap to the nut the spring is first properly put in place around the nut and then the cap passed over the same with the pin D through the cap at one side, and the cap and pin are turned around until the pin engages the hooked end of the spring and applies to such spring the proper amount of tension, and then the pin D is passed through the hole in the end of the bolt A and through the other side of the cap H, and such pin may be a split pin, so as to remain in place by the spring of the pin, or such pin may be a suitable wire with the end bent to prevent the pin falling out accidentally or becoming disconnected, and the pin performs the twofold duty of holding the spring under tension and of securing the cap in position.

The nut may be of any desired shape and made with or without a flange, and the spring is to act at one end against the nut and at the other end against the cross pin or wire in a hole or in a slot, as seen in Fig. 3. Should the nut remain in a fixed position, the spring will act to turn the bolt and take up any slackness.

I claim as my invention—

1. The combination with the bolt and nut, of a spring around the nut with one end engaging the nut, a cross-pin through the bolt with which the other end of the spring is engaged so as to apply a tension to the spring for turning one part to take up any slack, substantially as set forth.

2. The bolt having a cross-hole near the end, in combination with the nut surrounding the bolt and having a flange with grooves or recesses in the same, a spring coiled around the nut having one end in a recess or mortise and a cross-pin passing through the hole in the bolt and engaging the other end of the spring, substantially as set forth.

3. The bolt having a cross-hole near the end, in combination with the nut surrounding the bolt and having a flange with grooves or recesses in the same, a spring coiled around the nut having one end in a groove or recess and a cross-pin passing through the hole in the bolt and engaging the other end of the spring, a cap surrounding the nut and inclosing the spring, there being a hole through the cap for the cross-pin, substantially as set forth.

4. The combination with the bolt having a cross-hole through the same near the end, of a nut surrounding the bolt, and having a circular flange with grooves or recesses, a spring coiled around the nut and having one end entering a groove or recess in the flange of the nut, a cross-pin through the hole in the bolt and engaging the other end of the spring, a circular cap surrounding the spring and flange of the nut and having a recess for the end of the bolt and a cross-hole for the cross-pin, substantially as set forth.

Signed by me this 27th day of January, 1897.

CHAS. W. HUNT.

Witnesses:
   GEO. T. PINCKNEY,
   S. T. HAVILAND.